United States Patent [19]

Pena

[11] Patent Number: 5,029,662

[45] Date of Patent: Jul. 9, 1991

[54] HEATING ELEMENTS FOR VEHICLE WITH REMOTE CONTROL

[76] Inventor: Henry A. Pena, P.O. Box 687, La Madera, N. Mex. 87539

[21] Appl. No.: 480,616

[22] Filed: Feb. 15, 1990

[51] Int. Cl.$^5$ ................................................. B60T 7/16
[52] U.S. Cl. ........................................ 180/167; 62/150; 219/202; 219/203; 280/727
[58] Field of Search ............... 180/167, 170; 219/202, 219/203; 340/602; 280/727; 62/275, 150

[56] References Cited

U.S. PATENT DOCUMENTS

| | | | |
|---|---|---|---|
| Re. 30,686 | 7/1981 | Bucher | 123/179 B |
| 2,208,016 | 7/1940 | Cowles | 180/167 |
| 2,717,957 | 9/1955 | Ohlheiser | 340/602 |
| 4,606,307 | 8/1986 | Cook | 123/179 B |
| 4,737,629 | 4/1988 | Iwama et al. | 219/203 |
| 4,902,874 | 2/1990 | Tachimori et al. | 219/203 |

FOREIGN PATENT DOCUMENTS 945628  5/1949  France ................................. 219/203

Primary Examiner—Andres Kashnikow
Assistant Examiner—Eric Culbreth
Attorney, Agent, or Firm—Leon Gilden

[57] ABSTRACT

A remote starting apparatus utilizes a receiver for receiving a command signal from a remote transmitter operated by a user. The apparatus facilitates both the starting of the vehicle from a remote location as well as the supplying of extra fuel to the vehicle's carburetor as required. The receiver is positioned on the dashboard of the vehicle and a flexible heating pad may be employed to keep the window free and clear of accumulated condensation so that the receiver can receive the command signal generated by the remotely located transmitter.

2 Claims, 5 Drawing Sheets

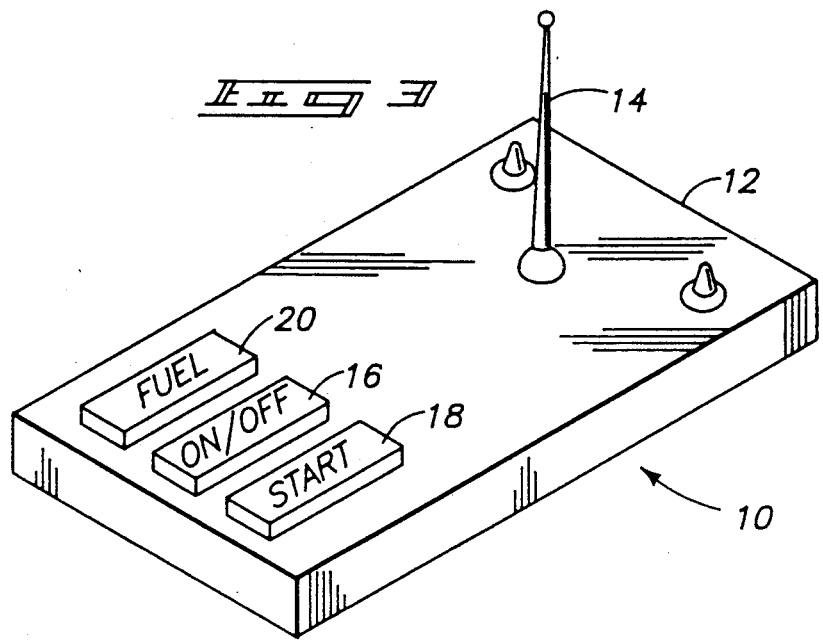
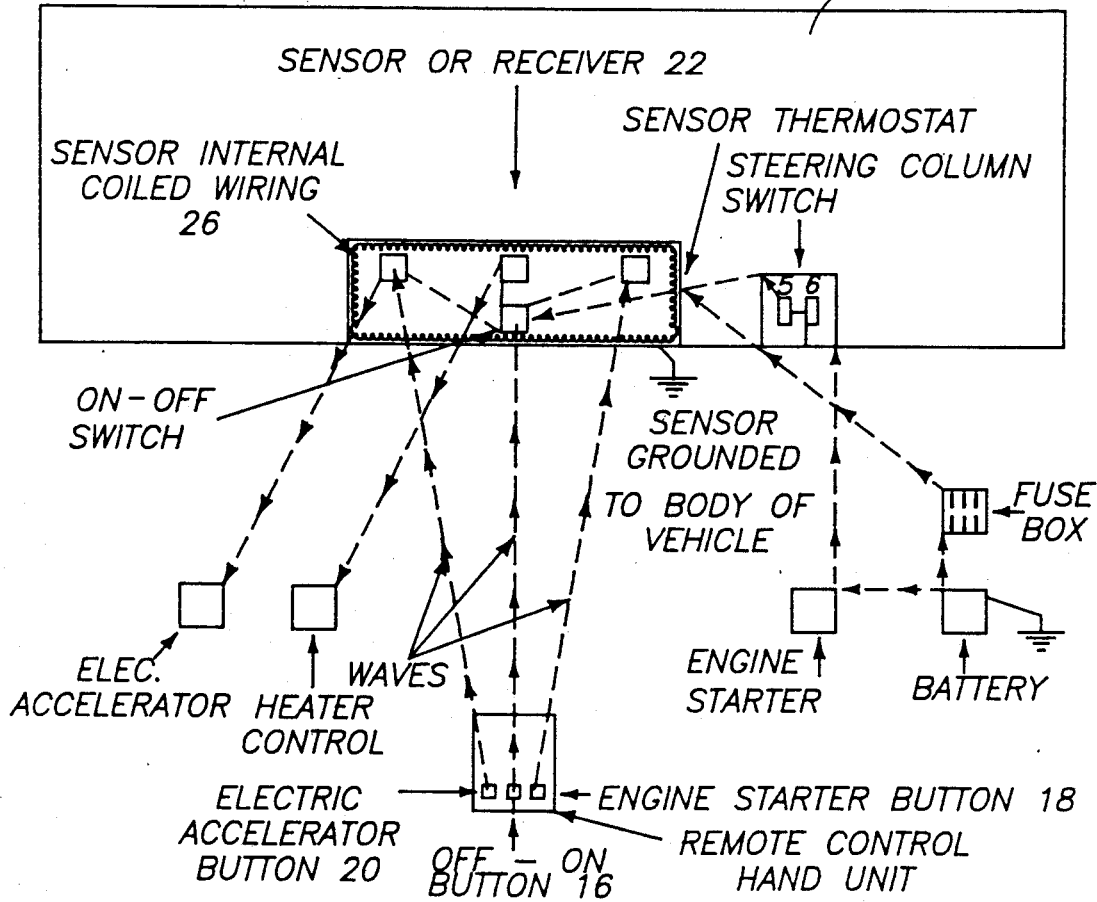

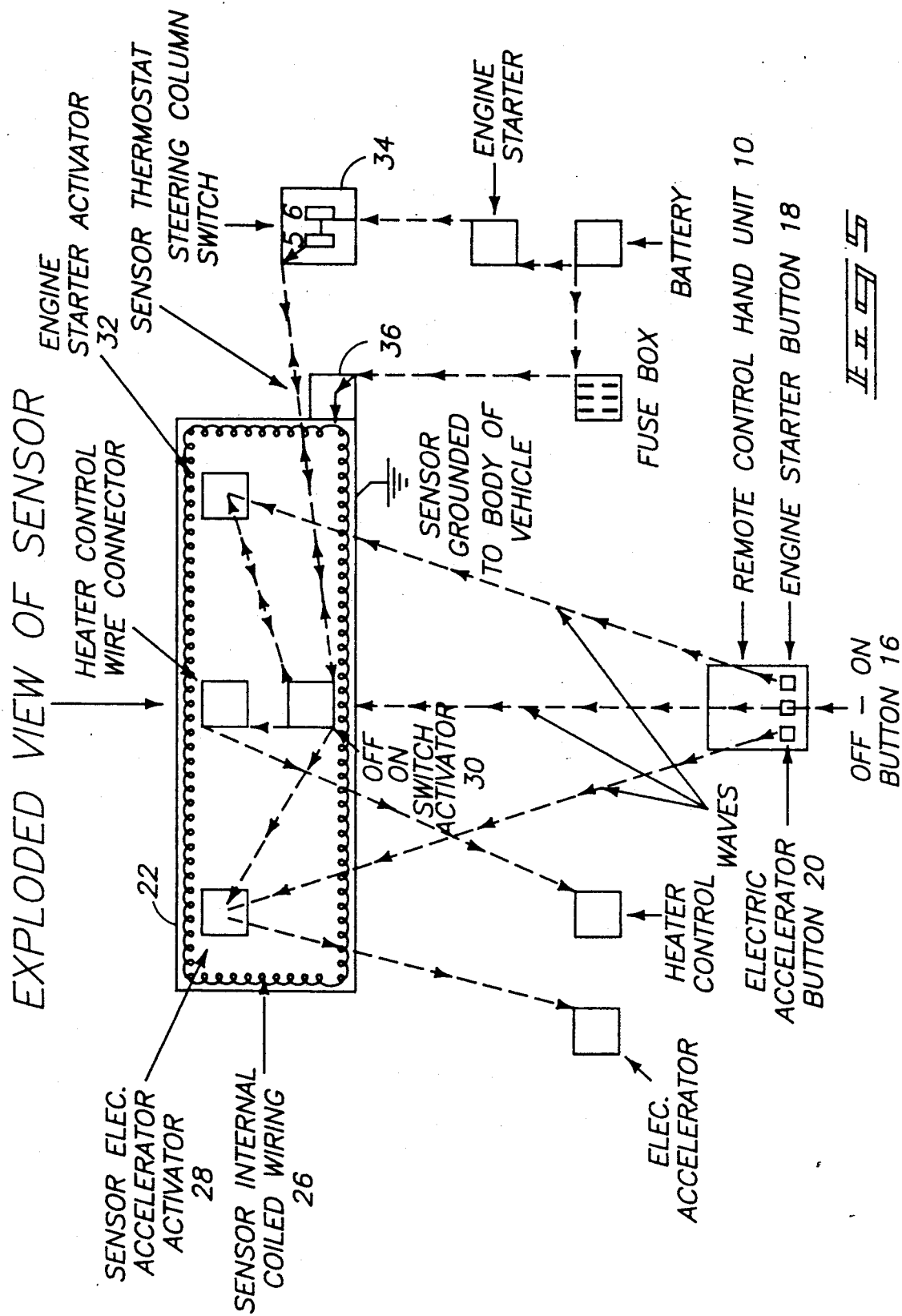

HEATING ELEMENTS FOR VEHICLE WITH REMOTE CONTROL

BACKGROUND OF THE INVENTION

1. Field of the Invention

The present invention relates to starting systems for vehicles, and more particularly pertains to a remotely located vehicle starting system which includes the use of a transmitter and receiver arrangement to facilitate such remote starting.

2. Description of the Prior Art

The use of remotely controlled starting systems for vehicles is known in the prior art. More specifically, remotely controlled starters heretofore devised and utilized for the purpose of remotely starting a vehicle are known to consist basically of familiar, expected and obvious structural configurations, notwithstanding the myriad of designs encompassed by the crowded prior art which have been developed for the fulfillment of countless objectives and requirements.

A typical example of a prior art automatic staring system for a vehicle is to be found in U.S. Pat. No. 4,606,307 which issued to Norman Cook on Aug. 19, 1986. The Cook patent discloses an automatic starting system for a vehicle which includes a clock and a remote-control receiver and transmitter combination which are electrically connected to the battery and operable to be energized for selectively connecting a current signal from the battery to the balance of the system. In addition to activating the vehicle's starter, an actuator and a vacuum pump combination enables the throttle-gas pedal linkage to be pumped when such pumping is appropriately a part of the recommended method to start the vehicle engine. The Cook starting system envisions the positioning of the receiver unit within the vehicle, presumably behind the windshield. As can be appreciated, in the event of clarity deterioration on the windshield as the result of the accumulation of ice or other condensation, certain transmitter receiver circuits might become inoperable—especially those which utilized an infrared signal. Accordingly, under some of the most adverse conditions such as when snow or ice accumulates on a windshield, a user of the Cook device might still find it difficult to remotely start his vehicle.

Another patent of interest is U.S. Pat. No. 30,686 which issued to Jeffry Bucher on July 1, 1981 and which discloses a remote starting system for a combustion engine. The system utilizes a receiver for receiving a command signal from a remote transmitter operated by a user, and the receiver generates signals to control operation of the vehicle's starting system. This system also enables the user, from the remote location, to effect a selective momentary pumping of fuel into the engine prior to activation of the starting operation, and then to start the engine. The system additionally includes means for maintaining the throttle of the engine substantially open until the engine is started, and then closing the throttle to idling position with automatic momentary pumping of additional fuel into the engine at predetermined intervals during the running of the engine in accordance with the starting operation. The disclosure of U.S. Pat. No. 30686 is incorporated herein by reference as a part of the combination of the present invention. While being functional for its intended purpose, again it can be appreciated that windshield clarity deterioration could adversely affect the receiving of a command signal by a receiver positioned within the vehicle's interior and accordingly, this patent also fails to particularly solve the undesired problem of windshield condensation accumulation.

Therefore, it can be appreciated that there exists a continuing need for new and improved remote starting systems for vehicles which can be reliably operated even when a vehicle's windshield is substantially covered by accumulated condensation. In this regard, the present invention substantially fulfills this need.

SUMMARY OF THE INVENTION

In view of the foregoing disadvantages inherent in the known types of remote starting systems for vehicles now present in the prior art, the present invention provides an improved remote starting apparatus construction wherein the same can be utilized reliably in those situations where a vehicle's windshield is essentially covered by accumulated condensation. As such, the general purpose of the present invention, which will be described subsequently in greater detail, is to provide a new and improved remote starting apparatus for a vehicle which has all the advantages of the prior art remote starting devices and none of the disadvantages.

To attain this, the present invention essentially comprises a remote starting apparatus which utilizes a receiver for receiving a command signal from a remote transmitter operated by a user. The apparatus facilitates both the starting of the vehicle from a remote location as well as the supplying of extra fuel to the vehicle's carburetor as required. The receiver is positioned on the dashboard of the vehicle, and a flexible heating pad may be employed to keep the window free and clear of accumulated condensation so that the receiver can receive the command signal generated by the remotely located transmitter.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out it various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved remote starting apparatus for a vehicle which has all the advantages of the prior art remote starting apparatuses for vehicles and none of the disadvantages.

It is another object of the present invention to provide a new and improved remote starting apparatus for a vehicle which may be easily and efficiently manufactured and marketed.

It is a further object of the present invention to provide a new and improved remote starting apparatus for a vehicle which is of a durable and reliable construction.

An even further object of the present invention is to provide a new and improved remote starting apparatus for a vehicle which is susceptible of a low cost of manufacture with regard to both materials and labor, and which accordingly is then susceptible of low prices of sale to the consuming public, thereby making such remote starting apparatuses for vehicles economically available to the buying public.

Still yet another object of the present invention is to provide a new and improved remote starting apparatus for a vehicle which provides in the apparatuses and methods of the prior art some of the advantages thereof, while simultaneously overcoming some of the disadvantages normally associated therewith.

Still another object of the present invention is to provide a new and improved remote starting apparatus for a vehicle which is particularly adapted for reliable use in those situations were a vehicle's windshield is substantially covered by accumulated condensation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective view of the remote transmitter forming a part of the present invention.

FIG. 4 is a conceptual representation of the working configuration of the present invention.

FIG. 5 is a further conceptual representation of the manner of operation of the present invention.

DESCRIPTION OF THE PREFERRED EMBODIMENTS

Figure 1:
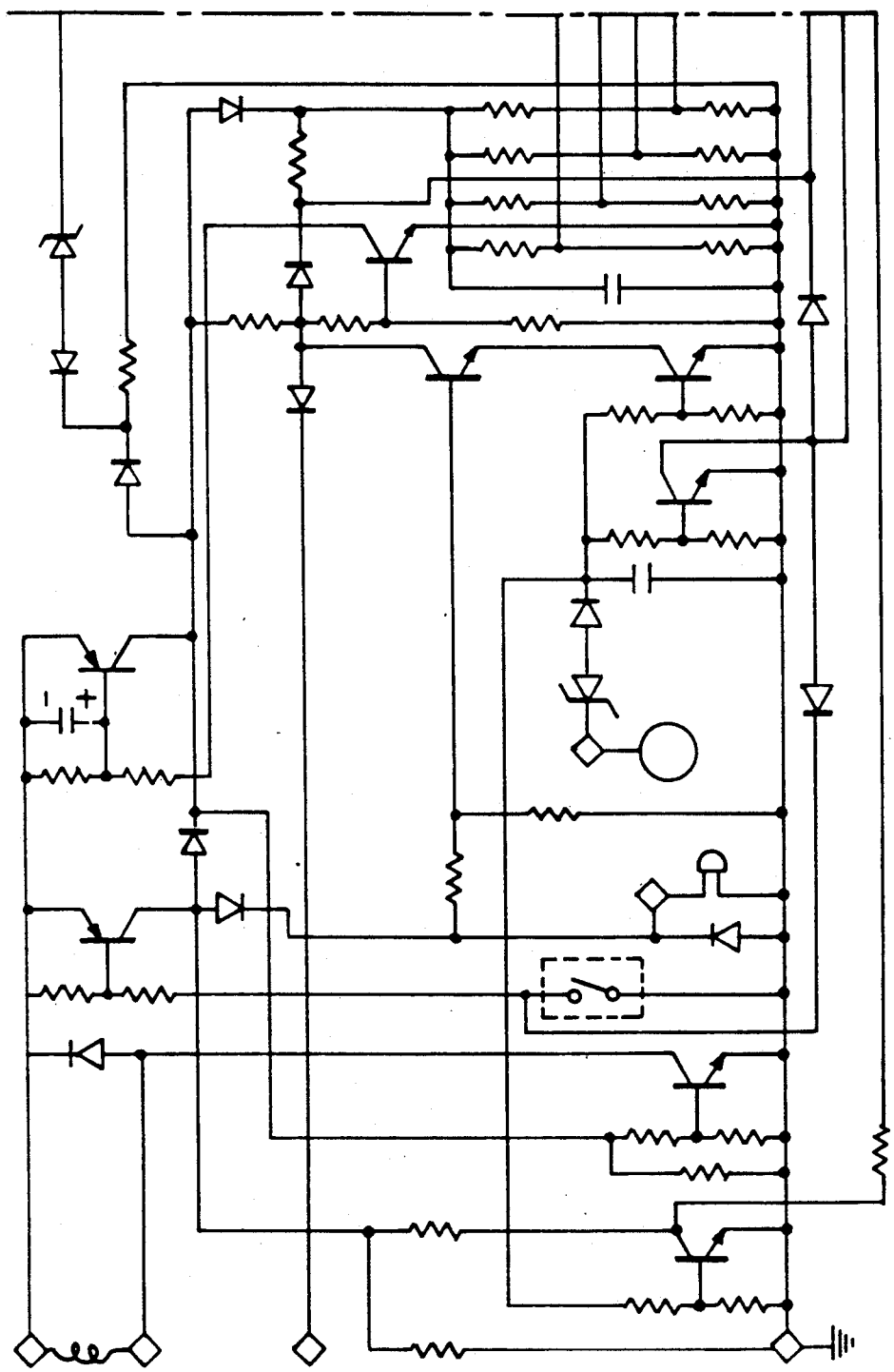
FIG. 1 is an electrical diagram illustrating the operable components of the starting system shown in U.S. Pat. No. 30,686 which is incorporated herein by reference.

With reference now to the draWings, and in particular to FIG. 1 thereof, a new and improved remote starting system for a vehicle embodying the principles and concepts of the present invention will be described.

Figure 2:
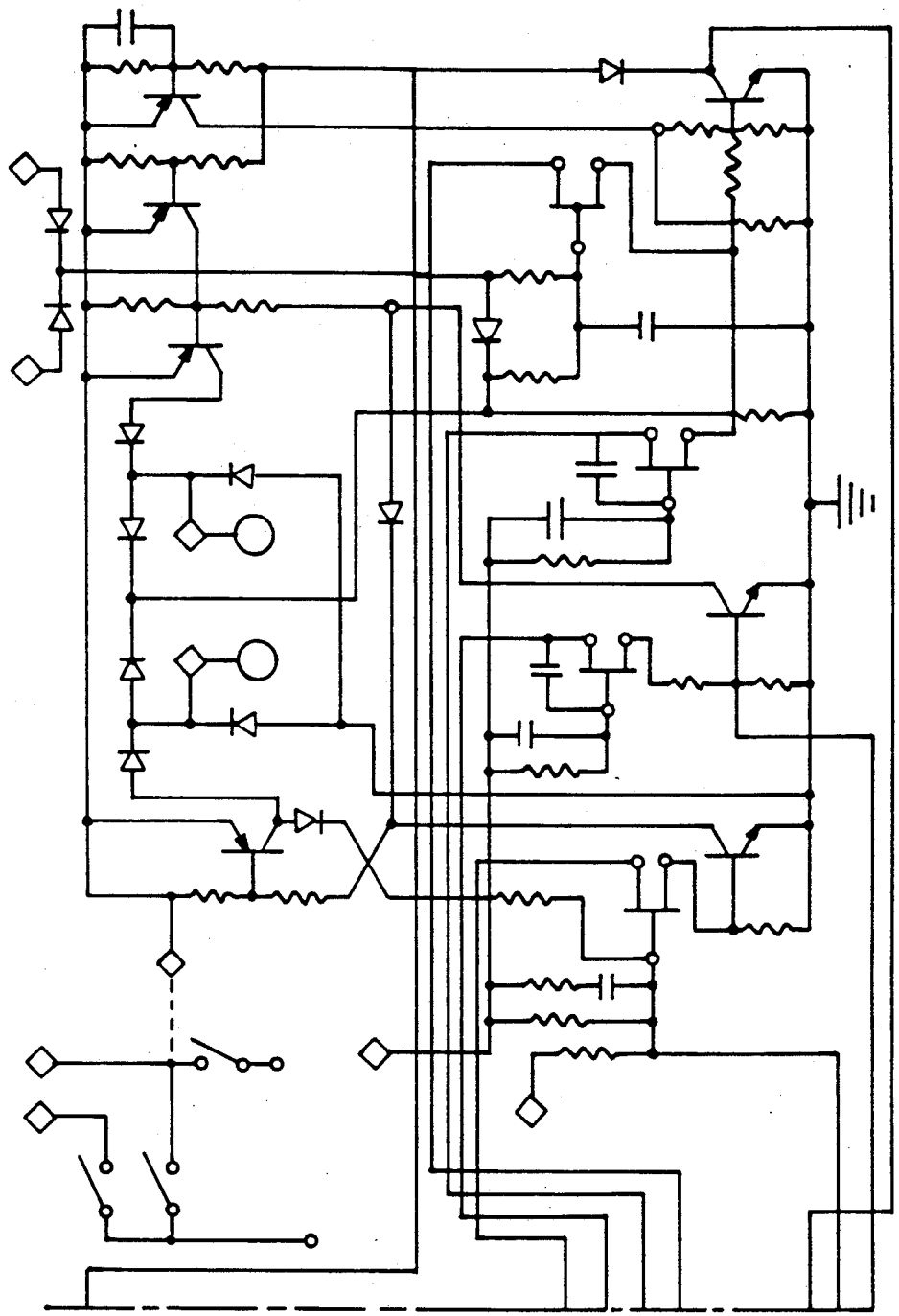
FIG. 2 is an electrical diagram showing additional operable components of the remote starting system described in U.S. Pat. No. 30,686 incorporated herein by reference.

More specifically, FIGS. 1 and 2 of the drawings represent the known prior art which is incorporated herein by reference. In this regard, FIGS. 1 and 2 essentially comprise the disclosure of U.S. Pat. No. 30,686 which issued to Jeffry Bucher on July 21, 1981, the complete disclosure of which is incorporated herein by reference so as to comprise a part of the combination of the present invention. Inasmuch as the disclosure of U.S. Pat. No. 30,686 completely describes the operation of the starting systems circuits shown in FIGS. 1 and 2, no further discussion relative to these circuits will be provided.

FIG. 3 of the drawings illustrates one preferred design of transmitter 10 which could be utilized to accomplish the purpose of the present invention. In this respect, the transmitter 10 includes a housing 12 from which a conventional antenna 14 extends. The transmitter 10 further includes an on/off button 16 and a start button 18 which may be depressed to deliver a command signal from the transmitter to a receiver unit positioned in a vehicle. Additionally, the transmitter 10 could include a fuel supply button 20 which is operable to deliver an selective amounts of fuel to the vehicle's carburetor in the manner described in U.S. Pat. No. 30,686.

FIGS. 4 and 5 of the drawings illustrate the basic concept of the invention in a manner which departs from an electrical circuit configuration. More specifically, these figures illustrate a conventional receiver 22 positioned on the dashboard of a vehicle behind the vehicle's windshield 24. The receiver 22 includes an internal coiled wire 26 which operates as a signal receiving antenna. The various components of the invention which are known in the prior art may include an accelerator activator 28, an on/off switch activator 30, and an engine starter activator 32. Additionally, a steering column switch 34 may be incorporated in the circuit if needed. However, most vehicles automatically prevent the starting of a vehicle unless the vehicle's transmission is in neutral or park.

Figure 6:
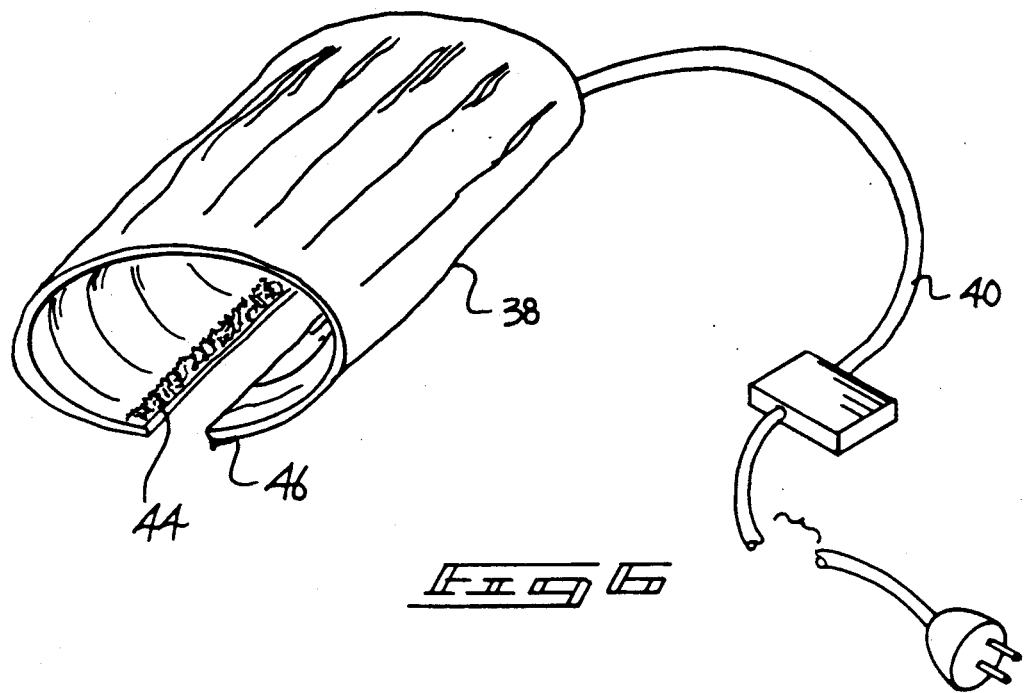
FIG. 6 is a perspective view of a first embodiment of a receiver and windshield heater associated with the present invention.

A unique feature of the present invention is the inclusion of a sensor thermostat 36 which can operate in conjunction with a flexible heating pad 38 as illustrated in FIG. 6. The heating pad 38 may utilize either an external alternating current power source by means of a flexible electrical connector 40 or alternatively, the pad could be powered by the vehicle's own battery 4. Regardless of the source of power, the heating pad 38 would be activated by the thermostat 36 associated with the receiver 22. The thermostat 36, can include either or both a temperature sensitive switch or a light reflective switch. The light reflective switch would preferably be of the well known type which directs a beam of light in a pulsed manner, and then detects and measures the amount of reflection, i.e., returned light. Accumulated condensation would reflect the switch's beam so as to effect a closing of the switch.

The heating pad 38 may include velcro connection means 44, 46 for operably fastening the same around the receiver 22. The pad 38 is designed to extend around the peripheral edge of the receiver 22 so as to not block the signal receiving sensors positioned on a front face of the receiver. The heat generated by the pad 38 operates to warm the windshield around the receiver 22, thereby to prevent the accumulation of various forms of condensation, such as snow, ice and the like, etc, which could adversely affect the receiving of the command signal from the remote control hand unit 10.

Figure 7:
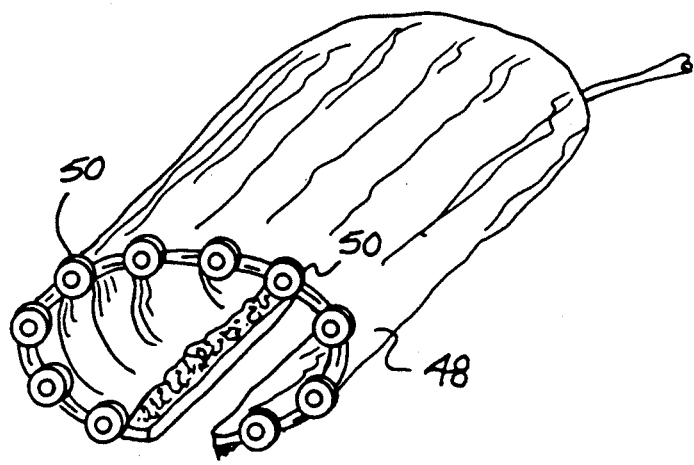
FIG. 7 is a perspective view of a second embodiment of the receiver and windshield and heater forming a part of the present invention.

FIG. 7 of the drawings illustrates a modified heating pad which is generally designated by the reference numeral 48. The heating pad 48 shown in FIG. 7 is also positionable around the peripheral edge of a dashboard-mounted receiver 22, and further includes the use of a plurality of suction cups 50 attached along an edge thereof defining a heat conduit to the interior surface of the windshield. The suction cups 50 are designed to be attached to an interior surface of the windshield around the front face of the receiver 22, and this results in a more reliable delivery of heated air to the windshield, thereby to keep the same free of accumulated condensation.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the U.S. is as follows:

1. A new and improved remote control starting apparatus for a vehicle, said remote control starting apparatus comprising:

transmitter means for delivering a command signal to a vehicle from a remote location;

receiver means positioned interiorly of said vehicle behind a windshield forming a part thereof, said receiver means being operable to receive said command signal from said transmitter means so as to effect a remote starting of said vehicle; and windshield clarity detection means positioned within said vehicle adjacent said windshield and being operable to detect condensation accumulation on said windshield, and further including condensation removal means, and said windshield clarity detection means includes a switch means operable in response to detected light reflection, said switch means being operable to activate said condensation removal means, and wherein said windshield clarity detection means includes a thermostat for activating said switch means, said thermostat functioning to detect a temperature at which condensation accumulation occurs on said windshield, and wherein said condensation removal means comprises a heating pad positionable around a peripheral edge of said receiver means, said heating pad being activated by said switch means so as to deliver a supply of warm air against said windshield, thereby to effect a removal of accumulated condensation.

2. The new and improved remote control starting apparatus for a vehicle as described in claim 1, wherein said heating pad is provided with at least one suction cup for effecting an attachment thereof to an interior surface of said windshield.

* * * * *